(12) United States Patent
Chester et al.

(10) Patent No.: US 8,770,670 B2
(45) Date of Patent: Jul. 8, 2014

(54) VEHICLE WHEEL PROTECTION DEVICE

(75) Inventors: Christopher John Chester, Auckland (NZ); Deborah Chester, Auckland (NZ)

(73) Assignee: Rimpro-Tec Holdings Limited, New Plymouth (NZ)

( * ) Notice: Subject to any disclaimer, the term of this patent is extended or adjusted under 35 U.S.C. 154(b) by 229 days.

(21) Appl. No.: 13/003,867

(22) PCT Filed: Jun. 16, 2009

(86) PCT No.: PCT/NZ2009/000107
§ 371 (c)(1),
(2), (4) Date: Feb. 8, 2011

(87) PCT Pub. No.: WO2010/036127
PCT Pub. Date: Apr. 1, 2010

(65) Prior Publication Data
US 2011/0121635 A1    May 26, 2011

(30) Foreign Application Priority Data
Sep. 29, 2008  (NZ) ........................... 571573

(51) Int. Cl.
*B60B 7/01* (2006.01)
(52) U.S. Cl.
USPC .................................................... 301/37.24
(58) Field of Classification Search
USPC .................. 301/37.01, 37.24, 37.11, 37.103, 301/37.106, 37.42
See application file for complete search history.

(56) References Cited

U.S. PATENT DOCUMENTS

| 4,856,572 A * | 8/1989 | Casanova et al. ............. 152/454 |
| 6,513,560 B2 * | 2/2003 | Roesgen et al. ............. 152/523 |
| 2003/0201665 A1 * | 10/2003 | Kenion .................... 301/37.103 |
| 2006/0145528 A1 * | 7/2006 | Dangleman ............. 301/37.101 |
| 2008/0018168 A1 * | 1/2008 | Conaway ................... 301/37.24 |

FOREIGN PATENT DOCUMENTS

| DE | 202006001071 U1 | 5/2006 |
| GB | 2397561 A1 | 7/2004 |
| GB | 2405844 A | 3/2005 |
| GB | 2410224 A | 7/2005 |
| GB | 2426491 A | 11/2006 |
| GB | 2433057 A | 6/2007 |
| JP | 57 175405 | 10/1982 |
| JP | 08-216602 A | 8/1996 |
| JP | 10 278504 | 10/1998 |
| JP | 2002 240502 | 8/2002 |
| NZ | 221861 | 6/1989 |
| WO | WO 93/07012 A2 | 4/1993 |
| WO | WO 96/07554 A1 | 3/1996 |
| WO | WO 00/24595 A1 | 5/2000 |
| WO | WO 03/106194 A1 | 12/2003 |
| WO | WO 2005/009761 A1 | 2/2005 |

* cited by examiner

*Primary Examiner* — S. Joseph Morano
*Assistant Examiner* — Jean Charleston
(74) *Attorney, Agent, or Firm* — Knobbe, Martens, Olson & Bear, LLP (57) ABSTRACT

This invention relates to a vehicle wheel protection device and a method for protecting wheels from curbing. The wheel protection device includes an elongate member or plurality of elongate members capable of being attached using an adhesive to the side wall of a tire, or the front face of a wheel rim or wheel trim.

17 Claims, 12 Drawing Sheets

VEHICLE WHEEL PROTECTION DEVICE

RELATED APPLICATIONS

This application is a U.S. National Phase of International Application No.: PCT/NZ2009/000107, filed Jun. 16, 2009, designating the U.S. and published in English on Apr. 1, 2010 as WO2010/036127A1, which claims the benefit of New Zealand Application No. 571573, filed Sep. 29, 2008.

STATEMENT OF CORRESPONDING APPLICATIONS

This application is based on the Provisional specification filed in relation to New Zealand Patent Application Number 571573, the entire contents of which are incorporated herein by reference.

TECHNICAL FIELD

This invention relates to a vehicle wheel protection device.

BACKGROUND ART

Vehicle wheels are often scraped and damaged when a driver is attempting to park or manoeuvre a car close to a kerb. The scraping of a wheel against a kerb is known as "kerbing" or "kerb rash".

Damage caused by kerbing is unsightly, and can also be expensive to repair. In cars with hubcaps attached to the wheel, the hubcap can be removed and replaced for a reasonable price. For wheels without hubcaps however, particularly alloy wheels, any damage caused to the wheel will be very expensive to repair, and in some cases may require the entire wheel to be replaced. In alloy wheels with low profile tyres, this damage may also be increased, as the cushioning effect is significantly reduced, making it more likely for kerbing to occur.

A number of attempts have been made to address the above problem. GB 2,397,561 describes a device for protecting a wheel rim that includes an elongate member that can extend around the rim of a wheel and is connected together at first and second ends of the member. This device has two flanges, the first of which is inserted between the tyre and the wheel rim and a the second of which acts to protect the outer rim of the wheel from scraping. This device has a number of disadvantages. Dirt and debris such as small stones may easily accumulate in the space between the tyre and the device. The device is also formed such that the portion of the device that extends from the outermost edge of the rim over the tyre is likely to catch on passing objects. This can result in either the entire device being pulled from the wheel, or damage to either the device (so it is not able to properly protect the wheel) or to the object that the device has contacted.

GB 2,398,765 describes a flap that is attached to a tyre or wheel to protect the wheel from kerb damage. The flap is located on either the tyre or wheel and extends over the rim—the flap is secured at its outer perimeter and the inner perimeter of the flap can be lifted to expose the rim. The use of a flap goes some way to protecting the wheel from kerbing, however it has a number of disadvantages. As above, dirt and debris may accumulate underneath the flap, and the non-secured portions of the flap may catch on passing objects and potentially pull the flap from the wheel. Additionally, at high speeds, air being forced under the flap can generate unwanted noise from each of the tyres or wheels on which the flap is attached.

A further problem also arises when a tyre or wheel needs to be replaced. Each of the above mentioned prior art devices is likely to need to be removed in order to properly remove and replace either the tyre or the wheel.

It is an object of the present invention to address the foregoing problems associated with known wheel protection devices or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Further aspects and advantages of the present invention will become apparent from the ensuing description which is given by way of example only.

DISCLOSURE OF THE INVENTION

According to one aspect of the present invention there is provided a vehicle wheel protection device including an elongate member or plurality of elongate members capable of being attached to the side wall of a tyre, front face of a wheel rim or wheel trim, wherein;

the elongate member or plurality of members substantially corresponds to the circumference of the tyre, wheel rim or wheel trim to which it is attached; and no part of the elongate member or plurality of members overlaps both the wheel rim and the tyre, or wheel trim and tyre when attached; and wherein if the elongate member is or plurality of members are attached to the tyre side wall, the elongate member extends perpendicularly from the tyre side wall to a greater extent than the front face of the wheel rim or wheel trim.

According to a further aspect of the invention there is provided a vehicle wheel protection device including an elongate member or plurality of elongate members capable of being attached to the side wall of a tyre, front face of a wheel rim or wheel trim, wherein the elongate member or plurality of members substantially correspond to the circumference of the tyre, wheel rim or wheel trim to which it is attached;

no part of the elongate member or plurality of members overlaps both the wheel rim and the tyre or wheel trim and tyre when attached; and the elongate member or plurality of members has a substantially D-shaped cross section; and wherein if the elongate member is or plurality of members are attached to the tyre side wall, the elongate member extends perpendicularly from the tyre side wall to a greater extent than the front face of the wheel rim or wheel trim.

According to a further aspect of the present invention there is provided a vehicle tyre including an elongate member or plurality of members integrally formed on a side wall of the tyre, wherein;

the elongate member or plurality of members substantially correspond to the circumference of the tyre on which it is formed;

no part of the elongate member or plurality of members contacts the wheel rim when the tyre is fitted to a wheel; and the elongate member or plurality of members extends perpendicularly from the tyre side wall to a greater extent than the front face of the wheel rim or wheel trim.

According to another aspect of the invention there is provided a method for protecting vehicle wheels from kerb damage, the method including attaching an elongate member or plurality of members to the side wall of a tyre, front face of a wheel rim or wheel trim, such that;

the elongate member or plurality of members substantially corresponds to the circumference of the tyre, wheel rim or wheel trim to which it is attached; and no part of the elongate member or plurality of members overlaps both the wheel rim and the tyre or wheel trim and tyre when attached; and if the elongate member is or plurality of members are attached to the tyre side wall, the elongate member extends perpendicularly from the tyre side wall to a greater extent than the front face of the wheel rim or wheel trim.

According to a further aspect of the invention there is provided a kit for protecting vehicle wheels from damage, the kit including;

at least one elongate member;

at least one attachment means adapted to attach a first face of the elongate member or plurality of members to a tyre side wall, wheel rim or wheel trim, such that no part of the elongate member overlaps both the wheel rim and the tyre or wheel trim and tyre when attached; and wherein if the elongate member is or plurality of members are attached to the tyre side wall, the elongate member extends perpendicularly from the tyre side wall to a greater extent than the front face of the wheel rim or wheel trim.

According to a further aspect of the invention there is provided a kit for protecting vehicle wheels from damage, the kit including;

at least one annular member;

at least one attachment means adapted to attach a first face of the at least one annular member to a tyre side wall, wheel rim or wheel trim such that no part of the at least one annular member overlaps both the wheel rim and the tyre or wheel trim and tyre when attached; and wherein if the at least one elongate member is attached to the tyre side wall, the at least one elongate member extends perpendicularly from the tyre side wall to a greater extent than the front face of the wheel rim or wheel trim.

In a preferred embodiment of the invention the elongate member is annular (i.e. a ring).

Preferably the ring is formed with a diameter in the range of approximately 10 inches to 50 inches, in one inch increments. As will be appreciated by those skilled in the art this size range corresponds substantially to the set size ranges of the majority of vehicle wheel and tyres. It is envisioned that a number of different sized rings will be available within this range to allow for attachment to wheels or tyres of any size, from small motor vehicle wheels to large truck tyres.

In further alternative embodiments, the elongate member may be produced in a continuous length, and can be cut to any size required by the user.

In preferred embodiments the elongate member has a width within the range of 3 mm-25 mm.

Preferably, the width of the elongate member is 4 mm-10 mm.

More preferably, the width of the elongate member is 6 mm.

Preferably, the elongate member has a height of 4 mm-10 mm.

More preferably, the elongate member has a height of 5 mm.

In further alternative embodiments, the vehicle wheel protection device includes two co-operating elongate members. In this alternative embodiment, preferably the first elongate member is adapted to removeably receive the second elongate member.

More preferably, the second elongate member is releasably attached to the first elongate member.

Preferably the first elongate member is attached to the side wall of a tyre or front face of a wheel rim using an attachment device, and the second elongate member is removeably attached to the first elongate member using a clip-fit mechanism or similar.

Preferably the attachment device of the first elongate member is an adhesive.

Preferably the at least one elongate member is made from a substantially rigid plastics material.

More preferably, the at least one elongate member is made from nylon or acrylonitrile butadiene styrene (ABS).

In preferred embodiments of the invention the elongate member is attached to the side wall of a tyre or front face of a wheel rim using an attachment device.

Preferably, the attachment device is an adhesive.

More preferably, the attachment device is an adhesive tape.

Still more preferably, the adhesive tape is continuous with the elongate member when attached to the side wall of a tyre or front face of a wheel rim.

For the purposes of this specification the term "adhesive" should be taken to mean any substance or device capable of securing two surfaces together, either temporarily or permanently, for example a polyurethane sealant, cyanoacrylate adhesive (superglue), temperature or light curing adhesives or any attachment devices coated by such adhesives, as would be apparent to a person skilled in the art. As will also be apparent to a person skilled in the art, the attachment devices used in the present invention are preferably weatherproof and strong enough such that the elongate member remains attached to the tyre or wheel rim during and following scraping against a kerb or similar.

In preferred embodiments of the invention the attachment device is semi-permanent. For the purposes of this specification "semi-permanent" should be taken to mean that the attachment device may be removed from the tyre or wheel when required, but the removal will require additional treatment of the elongate member and adhesive, for example with a solvent, boiling water or by the application of forces over and above those that would be experienced on the elongate member when being scraped against a kerb.

In further alternative embodiments, the elongate member may be integrally formed on a side wall of a tyre.

In alternative embodiments, two annular elongate members of different sizes are attached to a single wheel rim to provide a double barrier of protection.

In order for the wheel protection device to be retrofitted to existing vehicles, kits containing necessary components for the wheel protection device may be made available for purchase.

Preferably, the kit includes a plurality of elongate members.

More preferably the kit includes at least 4 annular members.

Preferably the kit includes an attachment device.

More preferably, the attachment device is an adhesive tape.

In further preferred embodiments the kit also includes an alignment tool.

It is envisaged that the annular members will form kits specific to standard wheel sizes. It will be understood however that this is not limiting and the kit may include, for example, a single elongate member that may be cut to a specific length by the user to best suit his or her wheel protection needs.

BRIEF DESCRIPTION OF THE DRAWINGS

Further aspects of the present invention will become apparent from the ensuing description which is given by way of example only and with reference to the accompanying drawings in which.

DETAILED DESCRIPTION OF THE INVENTION

A preferred embodiment of the invention is outlined below, with reference to FIGS. 1-3. This embodiment is by way of example only and is in no way intended to be limiting.

Figure 1:
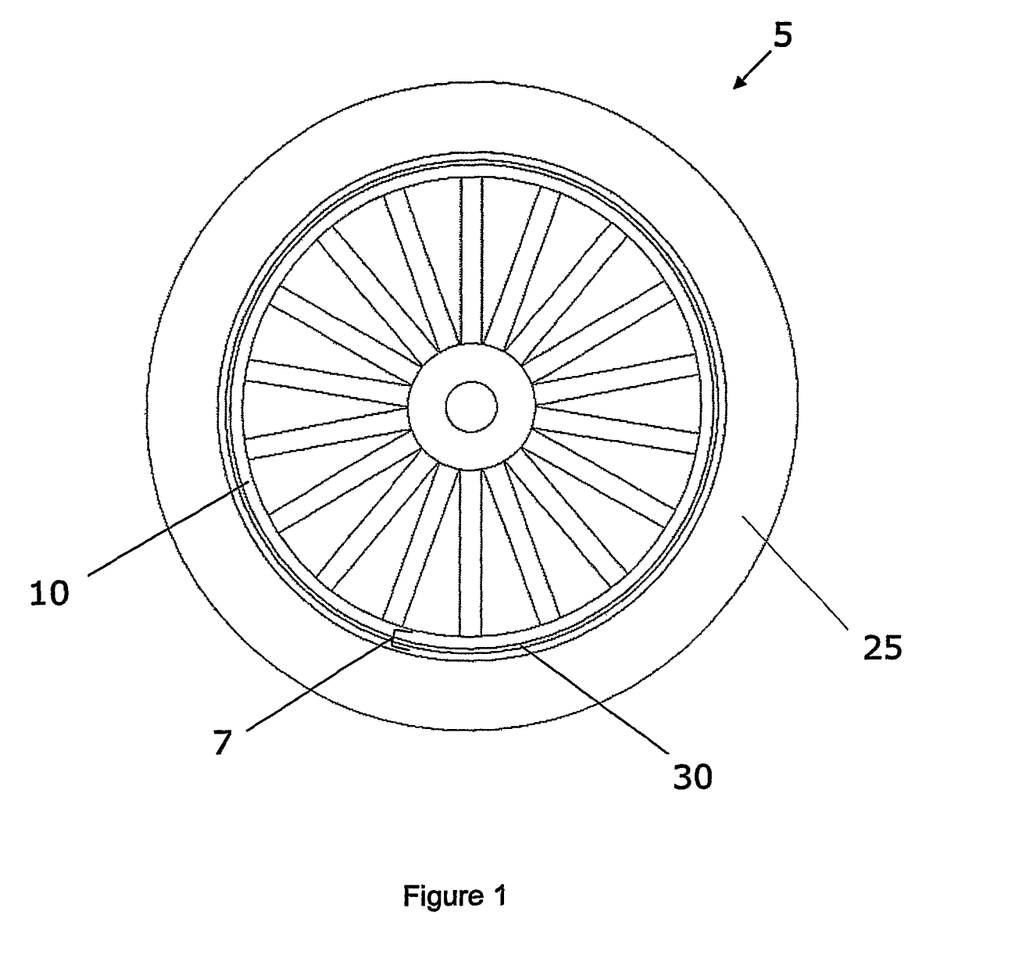
FIG. 1 shows a vehicle wheel including the vehicle wheel protection device in a preferred embodiment of the invention.

FIG. 1 shows vehicle wheel 5, wherein vehicle wheel protection device 7 is attached to the front face of wheel rim 10 of vehicle wheel 5. Vehicle wheel protection device 7 is in the form of annular (ring shaped) member 30 and is attached to wheel rim 10 by an attachment device 20 (best seen in FIGS. 2 and 3). In FIG. 2 wheel protection device 7 has been shown cut away to more clearly depict attachment device 20.

Figure 2:
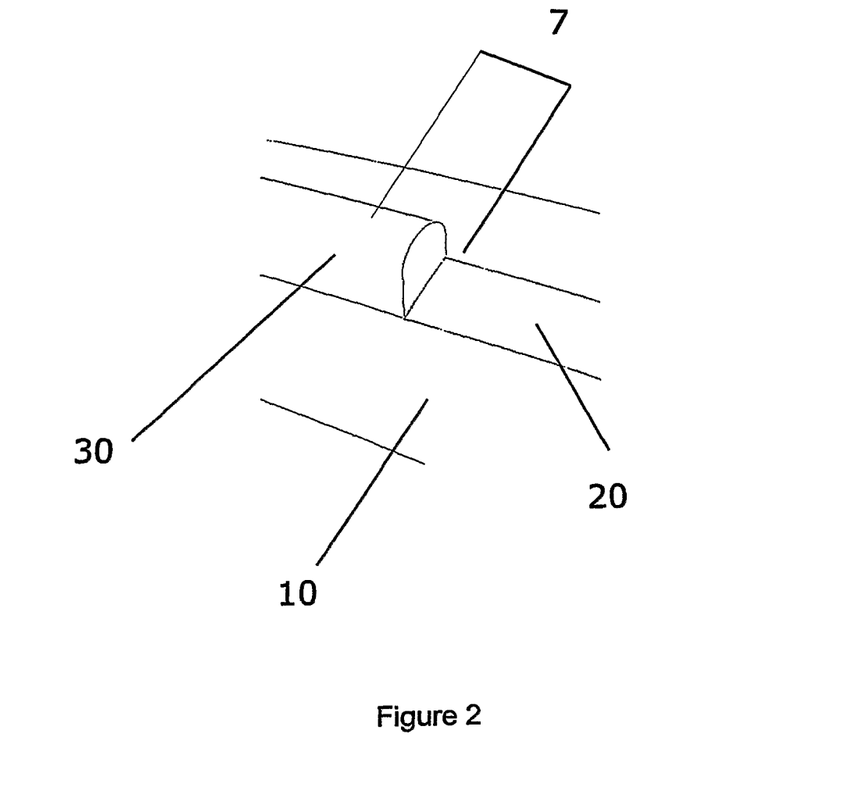
FIG. 2 shows a perspective view of the vehicle wheel protection device of FIG. 1 as applied to a wheel rim.

In use, as shown in FIGS. 1 and 2, wheel protection device 7 is positioned preferably near the outermost edge of the front face of wheel rim 10 and corresponds substantially to the circumference of wheel rim 10. So positioned, protection device 7 extends perpendicularly from front face of wheel rim 10 and acts as a buffer to prevent damage to wheel rim 10 from a kerb if the wheel 5 is scraped along the kerb.

Elongate member 30 is preferably formed as a ring through an injection molding process or similar and is envisaged to be pre-formed to specific sizes for use on standard sized wheel rims, in particular rims sized 10" to 50". The sizing of elongate member 30 increases in one inch increments to ensure that wheel rims or tyres of all sizes are catered for. Manufacturing annular elongate member 30 to a set size enables wheel protection device 7 to be sold in a ready-to use format that will be suitable for the majority of users.

Figure 3:
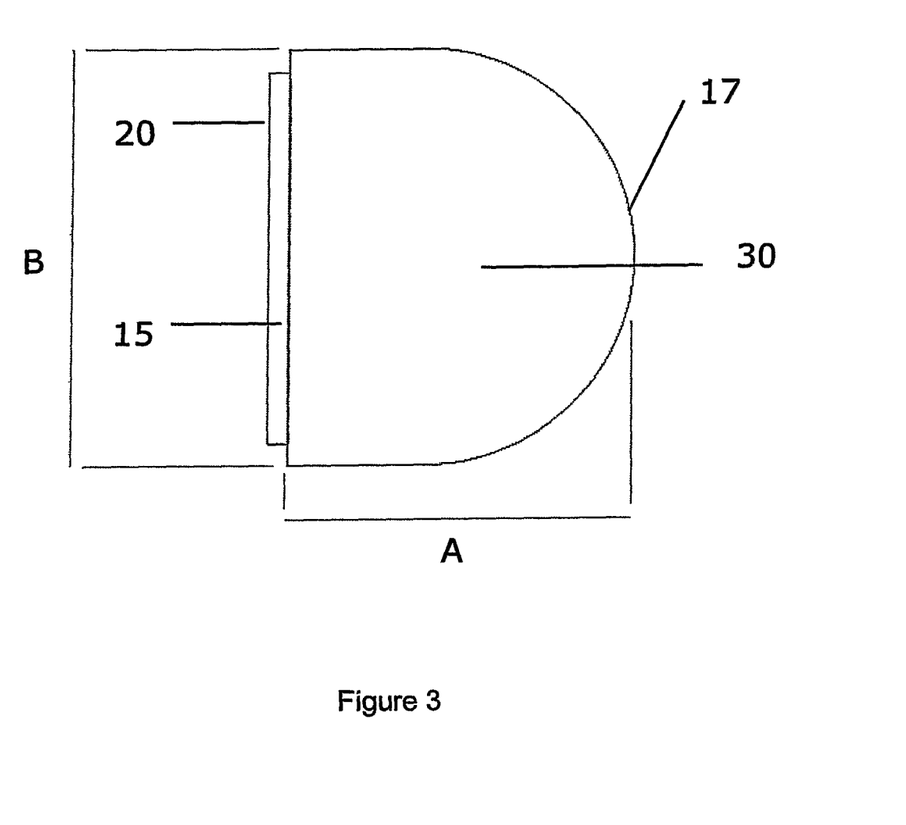
FIG. 3 shows a cross sectional view of the vehicle wheel protection device of FIGS. 1 and 2.

Preferably elongate member 30 is D-shaped in cross section as seen in FIGS. 2 and 3. The D-shaped cross section of elongate member 30 provides a substantially flat lower surface 15 for attaching elongate member 30 to the front face wheel rim 10 which is also likely to be substantially flat. The curved upper surface 17 of D-shaped elongate member 30 is easy to keep clean as there are no protruding flanges or additional grooves, and does not generate appreciable wind noise when a vehicle is traveling at high speeds. The D-shaped cross section of elongate member 30 also reduces the chance of elongate member 30 being caught on passing surfaces or objects and being torn from wheel rim 10 to which it is attached. As will be understood by a person skilled in the art however, this cross-sectional shape is not intended to be limiting and elongate body 30 may be formed in any cross sectional shape that will provide a surface that is able to absorb the impact of being scraped along a kerb.

As shown in FIG. 3, preferably height A of elongate member 30 is approximately 8 mm. The inventors have discovered that a height of approximately 8 mm gives optimum protection against kerb scraping, while not generating noise at high speeds, or protruding too far from wheel 5 so as to risk protection device 7 being caught on passing objects and damaged or pulled from wheel rim 10. As will be understood by a person skilled in the art, an elongate member with a depth of less than 2 mm (for example), will be less effective than an elongate member with a depth of 6 mm. At depths of 2 mm the risk of other areas of the wheel aside from the wheel rim hitting a kerb is increased, as uneven kerbs or surfaces may extend past the low barrier and still damage a part of the wheel face. At the other extreme, an elongate member that has a depth of, for example, 55 mm, may introduce noise at high speeds, will be more conspicuous to the passer-by, and may be damaged more readily than an elongate member which does not extend as far from the wheel rim or tyre.

The width B of elongate member 30 as shown in FIG. 3 is preferably approximately 6 mm. This width is effective in providing a substantial surface area on which kerb scraping can occur, and has also been determined by the inventors to fit wheel rim 10 of a wide variety of different sized and shaped wheels.

It should be understood however that the measurements as described above are not intended to be limiting and that elongate member 30 may be formed with different cross-sectional dimensions to suit individual requirements, or particularly small or large vehicle wheels.

Preferably elongate member 30, is manufactured from nylon. Other materials may be used to manufacture the elongate member 30, such as ABS (acrylonitrile butadiene styrene), rubber, resins, metal or other material as would be suitable for absorbing the force of a kerb as it passes. As would be understood by a person skilled in the art, the elongate member will be made of rigid material that is resistant to scraping and direct force, as the more damage the elongate member can be subjected to, the less often it will need to be replaced and the less the likelihood of the wheel rim being damaged through wearing down of elongate member thus exposing the face of wheel rim 10 to the kerb.

Elongate member 30 may be formed using various methods as would be apparent to a person skilled in the art. For example, elongate member may be manufactured using extrusion methods such as injection molding, blow molding and rotational molding or extruded from a dispenser with a pre-formed nozzle for shaping the elongate member to the specific size required by the user.

The elongate member is envisaged to be made in a variety of colours and may be used for decorative as well as protective purposes. Other decorative elements such as LEDs or reflectors made be either pre-formed within elongate member 30, or retrofitted to elongate member 30 to further enhance the decorative qualities of the member. Patterned surfaces or advertising material may also be incorporated into or on elongate member 30.

Elongate member 30 is attached to wheel rim 10 by attachment device 20. In the preferred embodiment of the invention attachment device 20 is a double sided adhesive tape. One such tape that is particularly suited to this invention is 3M™ VHB™ tape. 3M™ VHB™ tape is best applied to the flat surface 15 of elongate member 30, then elongate member 30 and attached attachment device 20 are then applied to wheel rim 10, with pressure applied to elongate member 30 to achieve a firm bond with wheel rim 10. Once bonded in position, 3M™ VHB™ tape provides a strong semi-permanent bond, but may be removed from wheel rim 10 using water at 100° C.

Figure 4:
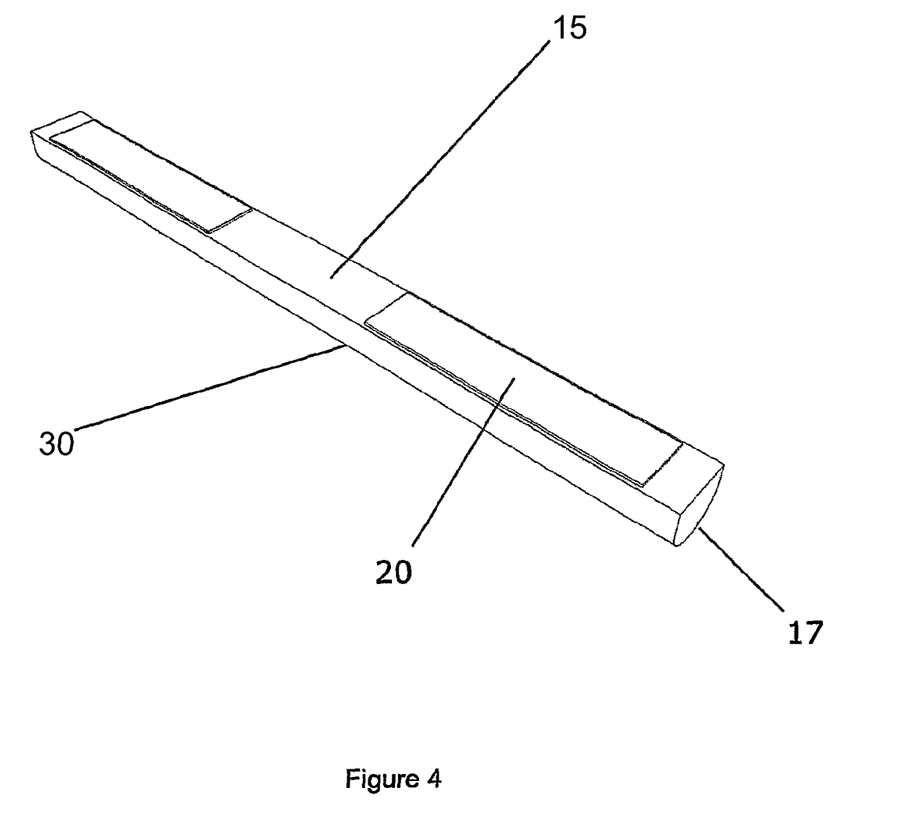
FIG. 4 shows a rear perspective view of the elongate member and attachment device in an alternative embodiment of the invention.

As shown in FIG. 2, attachment device 20 is preferably placed in a continuous strip along flat surface 15 of elongate member 30. However, it will also be understood by a person skilled in the art that adhesive tape 20 may be applied as a number of individual strips along elongate member 30 as shown in FIG. 4, or in any other configuration. Individual strips of adhesive tape as seen in FIG. 4 are particularly suited for attachment of smaller annular elongate members 30 where the curve in elongate member 30 cannot be neatly and effectively covered using a continuous strip of tape 20.

Figure 5:
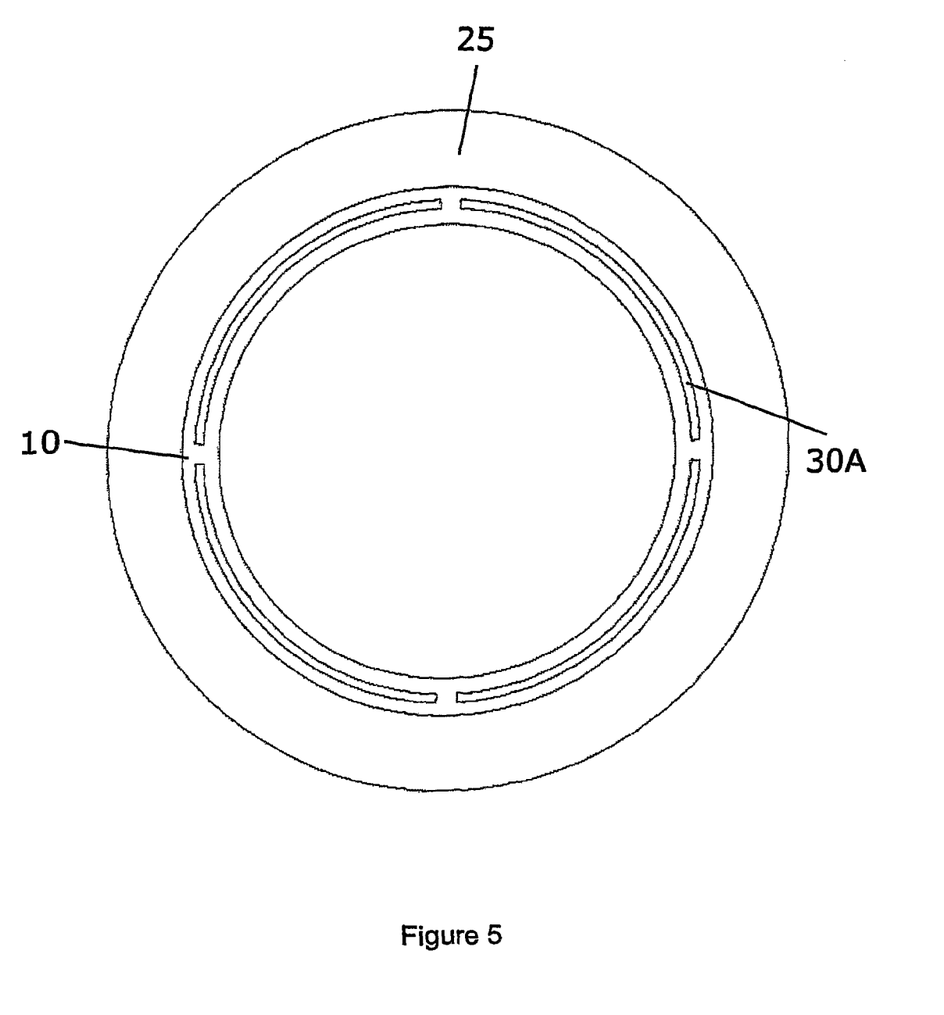
FIG. 5 shows the vehicle wheel protection device in an alternative embodiment of the invention.

FIG. 5 shows a variation to the preferred embodiment in which a plurality of elongate members 30A are attached to wheel rim 10. In use, any number of elongate members 30 may be used, depending on the preference of the user and the length of the elongate members. In further examples a user may attach an annular wheel protection device on each of the front wheel rims of their car, and may attach four shorter curved elongate members similar to those shown in FIG. 5 on each of the rear wheels of the car, substantially covering the circumference of the rear wheel rims. It should be understood that any variation and combination of elongate members is envisaged to suit both functional and aesthetic requirements of the user. It should also be understood that for optimum protection shorter elongate members 30A should correspond as closely as possibly to the circumference of wheel rim 10.

Figure 5A:
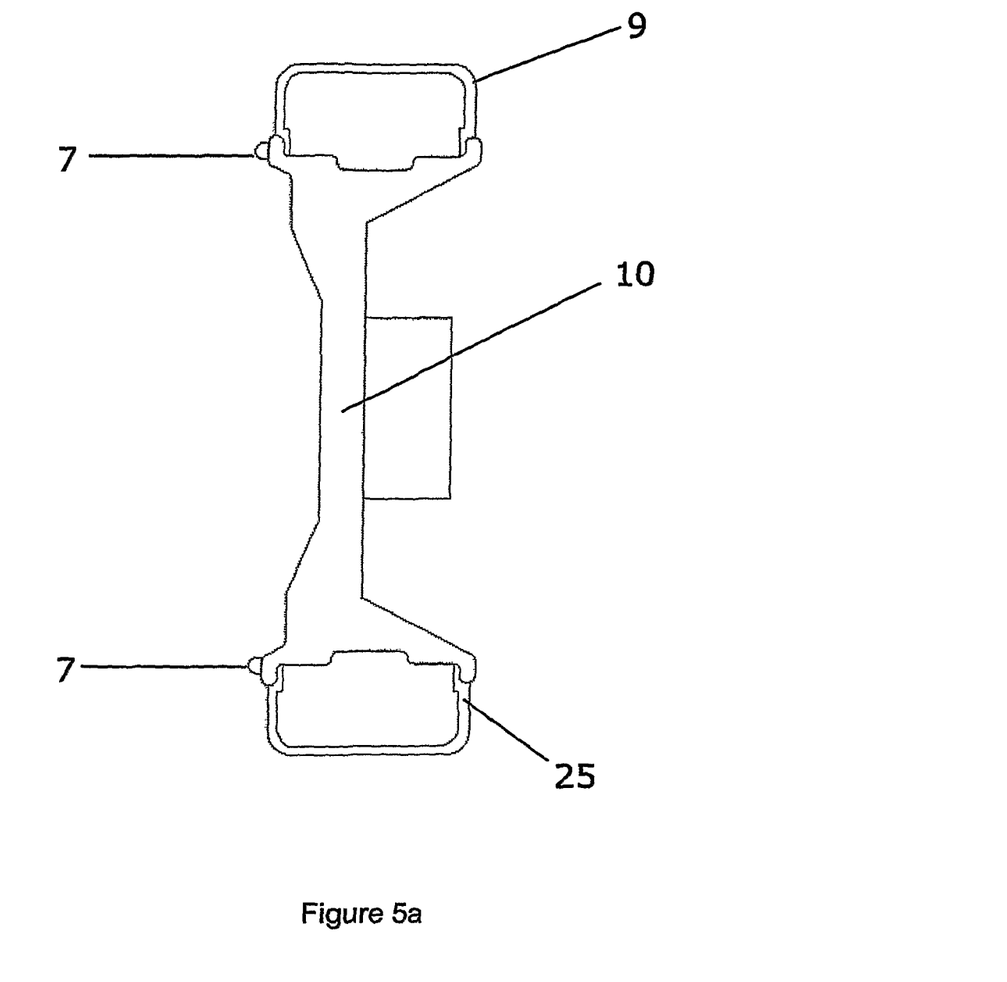
FIG. 5A shows a side view of the wheel protection device of FIG. 3 as applied to a tyre side wall.

It is also envisaged that protection device 7 can be attached directly to tyre 25 as shown in FIG. 5A, as well as, or instead of attachment to wheel rim 10. In this alternative embodiment, the elongate member or members are formed substantially near the inner circumference of the tyre side wall 9 (i.e. as close to the interface between the tyre and rim as possible). Protection device 7 may be attached to tyre 25 at manufacture, allowing customers to purchase a tyre with a rim protector pre-formed, or may be retro-fitted to an existing tyre. A tyre with a pre-formed or retro-fitted elongate member may also be used in conjunction with a further elongate member attached to the wheel rim of the vehicle wheel for additional protection or visual appeal.

When retro-fitted to tyre 25, elongate member 30 is preferably attached using 3M™ VHB™ tape in the same manner as described earlier for attachment to wheel rim 10. In preferred embodiments, the method of attachment of protection device 7 remains substantially the same regardless of the surface to which protection device 7 is being fitted.

If protection device 7 is attached directly to, or integrally formed with, tyre 25, elongate member 30 must be of a sufficient height that elongate member 30 extends perpendicularly from the tyre side wall substantially further than any other portion of wheel rim 10 as shown in FIG. 5A. This ensures that elongate member 30 is scraped against the kerb before any other part of wheel rim 10, thereby protecting wheel rim 10 from damage.

In further alternative embodiments, wheel protection device 7 may be fitted to the wheel trim (or hub cap) of the wheel (not shown). Protection device 7 may be attached to the face of the wheel trim to provide protection to the wheel trim against scraping or other damage, or to cover existing damage. As would be understood by a person skilled in the art wheel protection device 7 may be attached to both the wheel trim and wheel rim 10 (for example) on the same wheel if required.

The location of the protection device 7 will ultimately be the decision of the user, however attachment to wheel rim 10 is preferable, as wheel rim 10 is then directly protected by protection device 7 and protection device 7 will not need to be refitted if a tyre needs to be changed.

In further alternative embodiments elongate member 30 may be formed in a single long strip that can be cut to required length by the user. This variation will allow the product to be attached in a range of configurations, such as in a continuous strip joined at the ends so as to form a ring, or in shorter individual strips as depicted in FIG. 5. As would be understood by a person skilled in the art, other variations may be possible. For example elongate member 30 may be produced in a single strip that is manufactured to a correct length to fit wheel rims 10 of specific sizes, such as 15 inch or 20 inch. In such an embodiment elongate member 30 may include connection means on each end of the elongate member 30 to secure each end of elongate member 30 together in a ring shape. Such connection means may be in the form of corresponding female and male members, clasps, hooks or similar.

While elongate member 30 preferably has a D-shaped cross-section as described earlier and shown in FIGS. 2-4, other variations to the cross-sectional shape are envisaged by the inventors.

Figure 6:
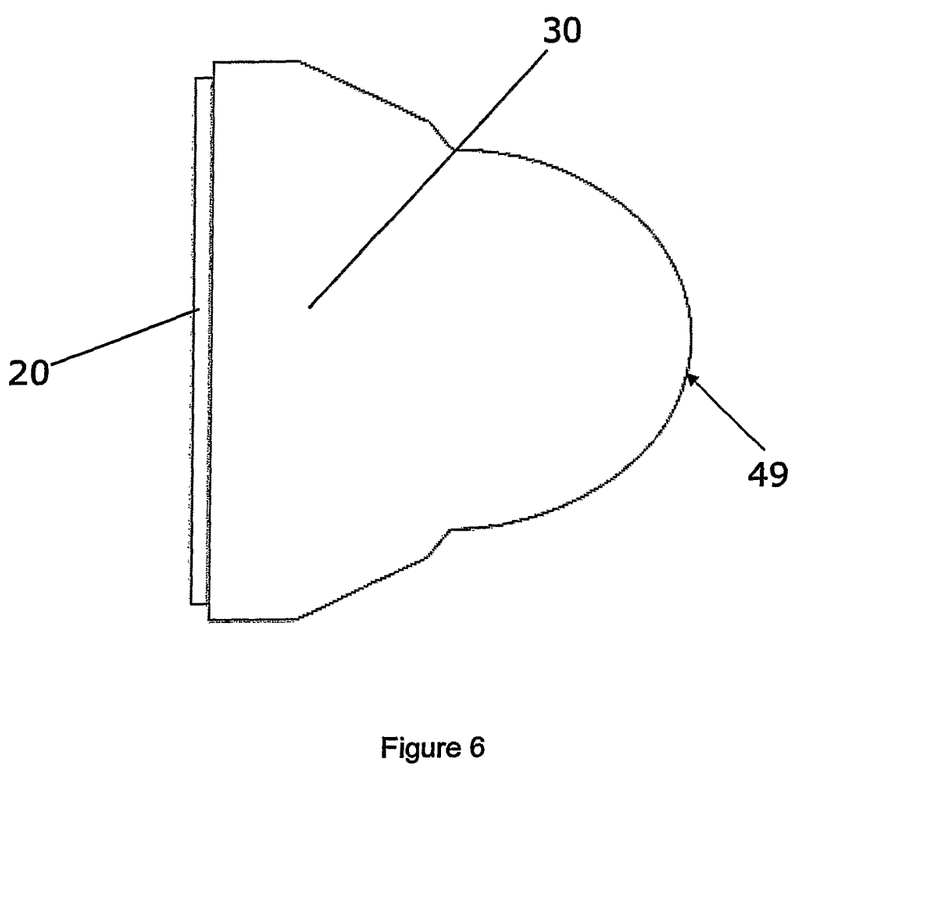
FIG. 6 shows a cross sectional view of the elongate member and attachment device in an alternative embodiment of the invention.
Figure 7:
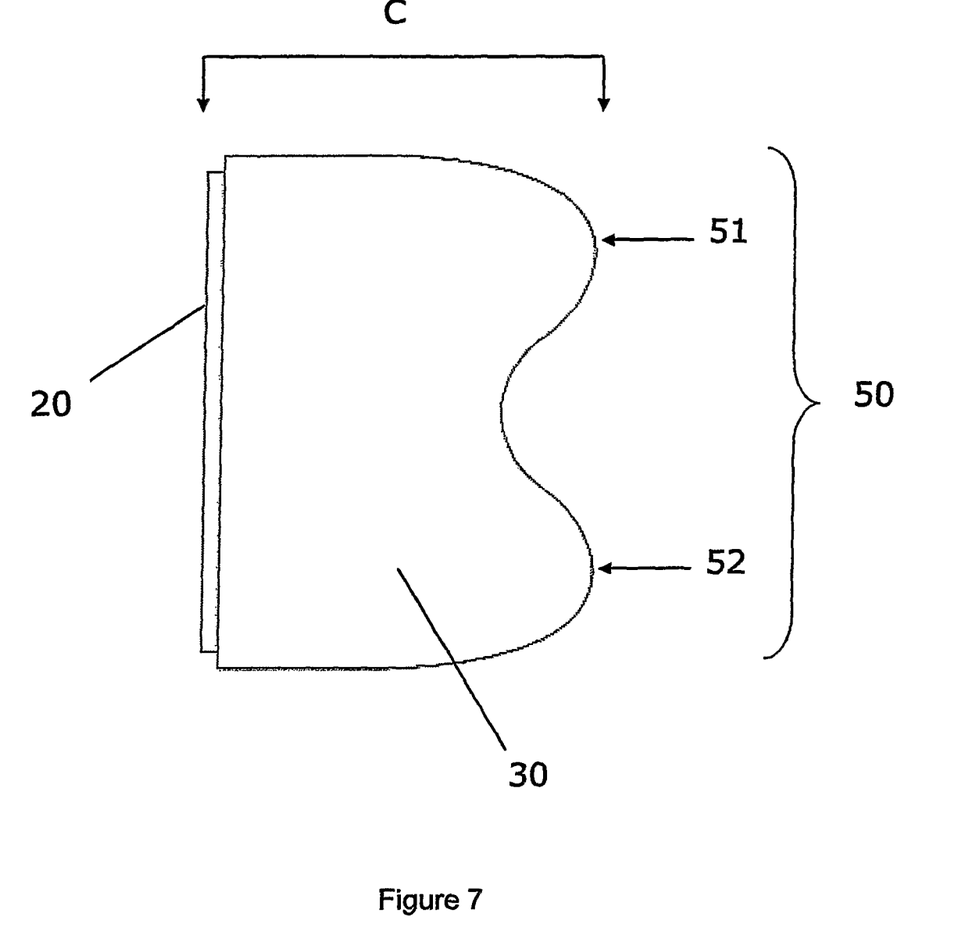
FIG. 7 shows a cross sectional view of the elongate member and attachment device in a further alternative embodiment of the invention.

Indicative examples of alternative cross sectional shapes are shown in FIGS. 6 and 7. FIG. 6 shows elongate member 30 with a cross-section which includes a raised central ridge 49. FIG. 7 shows elongate member 30 with a wave shaped cross-section 50 that provides two surfaces 51 and 52 for contacting a kerb. In each cross sectional variation it will be understood by a person skilled in the art each elongate member 30 is preferably approximately 5 mm at its highest point (as shown by C in FIG. 7). This ensures that elongate member 30 can still provide effective protection against kerbing by contacting the kerb before any other part of the wheel. Other variations such as square, rectangular, triangular and similar cross sections are envisaged but not shown.

Figure 8:
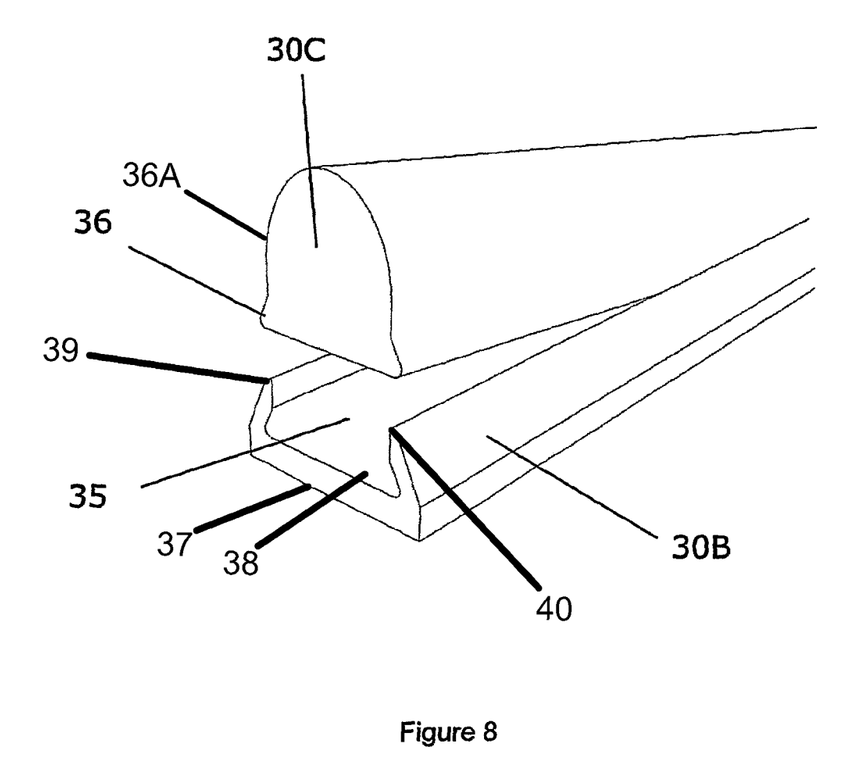
FIG. 8 shows a perspective view of the vehicle wheel protection device in accordance with a further embodiment of the invention.
Figure 9:
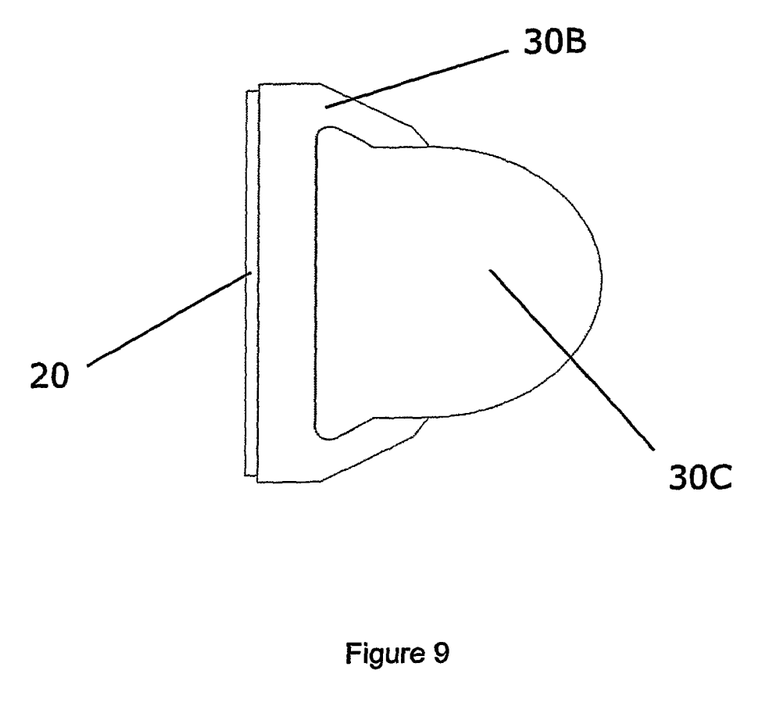
FIG. 9 shows a cross sectional view of the elongate members and attachment device of the embodiment shown in FIG. 8.

In a further variation of the invention shown in FIGS. 8 and 9, wheel protection device 7 may be formed of first 30B and second 30C elongate members. In the variation shown in FIGS. 8 and 9, elongate member 30B includes a recess 35 adapted to receive part of second elongate member 30C. The base and lower body 36 of second elongate member 30C corresponds to recess 35 so that elongate member 30C can be releasably inserted within recess 35, connecting elongate member 30C to elongate member 30B. This arrangement provides the user with the option of removing elongate member 30C from elongate member 30B to change the colour of elongate member 30C, or to replace elongate member 30C when it becomes damaged, without having to remove the entire wheel protection device 7 and realign and attach a new device 7.

As demonstrated in both FIGS. 8 and 9, first elongate member 30B includes a first substantially planar surface 37 adapted for attachment to the front face of the tire, wheel rim or wheel trim. First planar surface 37 is attached preferably using adhesive tape 20 although other variations of attachment means are envisaged as described below. Elongate member 30B further includes a second substantially planar surface 38, substantially parallel to surface 37. Second planar surface 38 receives second elongate member 30C within recess 35 and second elongate member 30C is held in a fixed position by flanges 39 and 40. Flanges 39 and 40 are preferably shaped to correspond substantially to at least a portion of the side walls 36A and base 36 of second elongate member 30C, providing an interference fit between first elongate member 30B and second elongate member 30C.

As would be understood by a person skilled in the art, elongate members 30B and 30C may be connected by a number of different attachment means. For example elongate member 30C may be attached to elongate member 30B using a semi-permanent adhesive, using an alternative click fit connection configuration to that depicted in FIGS. 8 and 9, or by fixed connection means such as a screw that can hold elongate member 30C to elongate member 30B at specific points.

Elongate member 30 (and/or alternative elongate members 30B and 30C) and attachment device 20 can also be produced as a kit for retrofitting to car wheel rims or tyres. It is envisaged that the kit will include a set of four annular elongate members 30 specifically sized to fit wheel rims 10 or tyres 25 of a standard size as would be known to a person skilled in the art. Preferably the kit will also include attachment means (such as 3M™ VHB™ tape) and a set of instructions for applying and removing the tape. The contents of such kit should not however be limited to the contents described above, and may include other components such as cleaning wipes, a tool to aid in alignment of wheel protection device 7 to the wheel rim and/or a tape measure. Components of the kit may also be sold individually with the elongate members available in a wide range of colours and styles.

Figure 10:
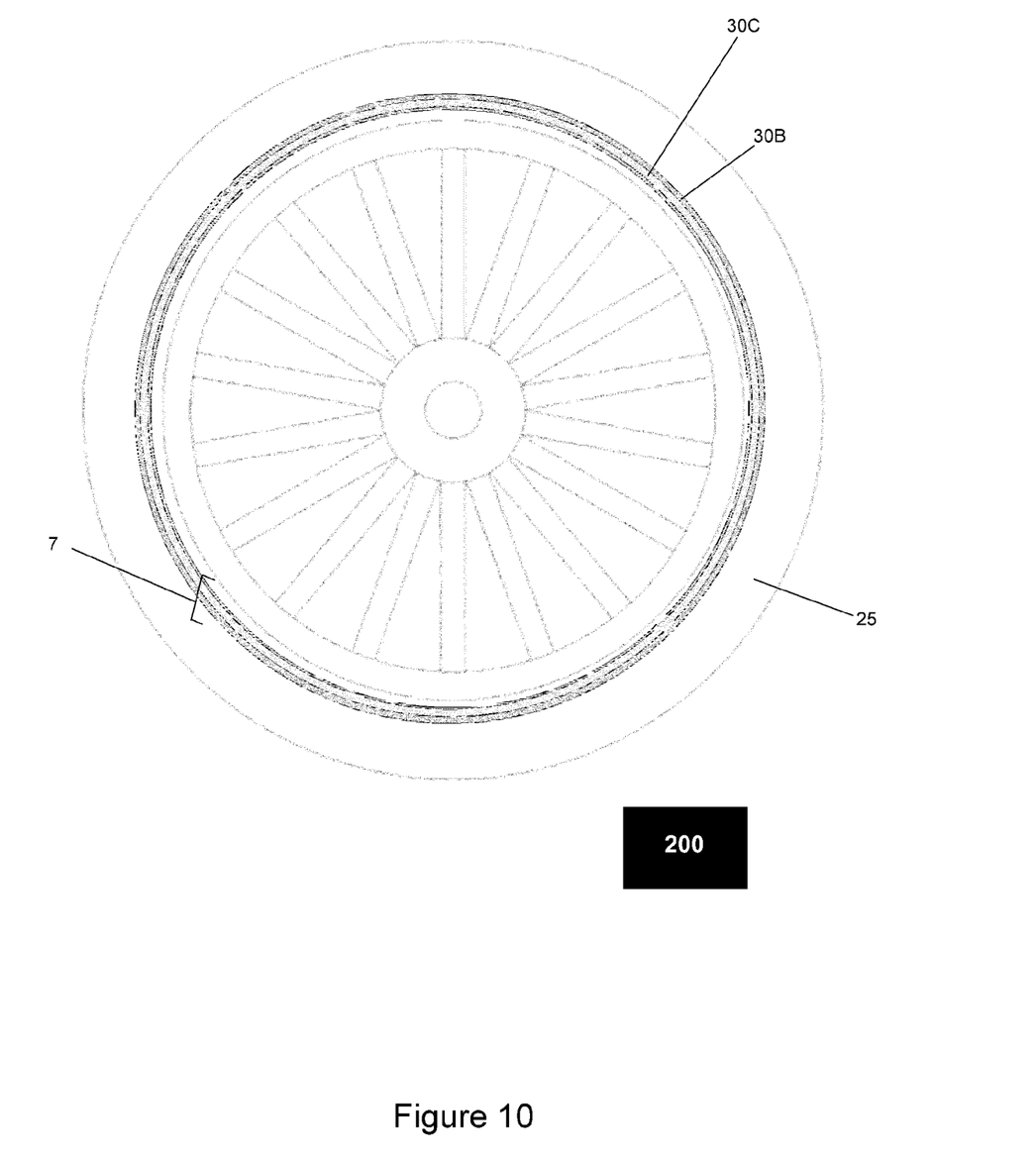
FIG. 10 shows the wheel protection device as shown in FIGS. 8 and 9 as applied to the side wall of a tire, along with an alignment tool.
Figure 11:
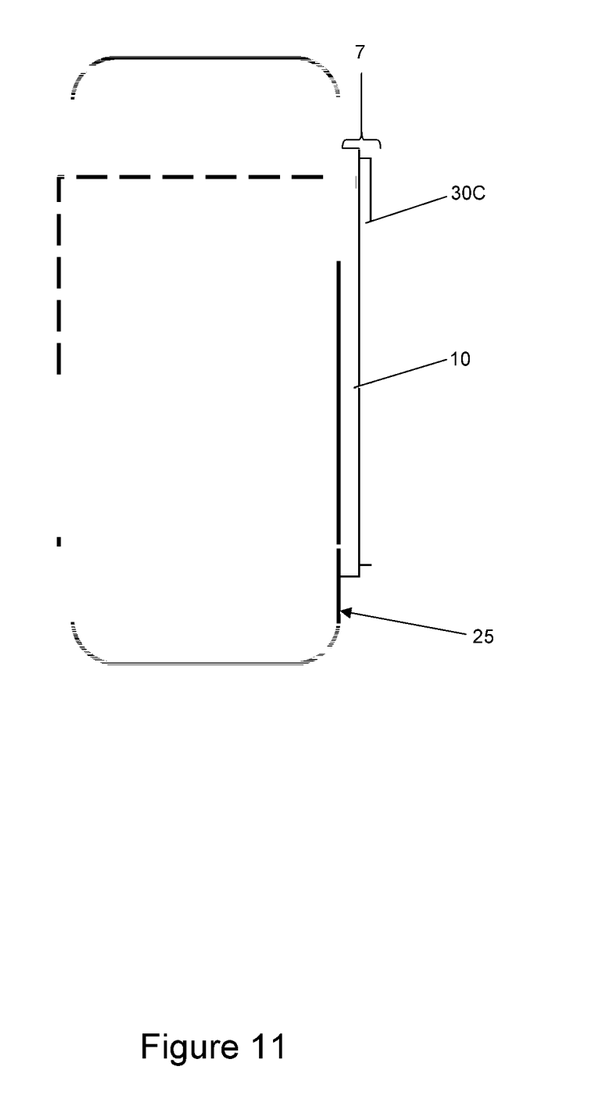
FIG. 11 shows a side view of the wheel protection device as shown in FIGS. 8 and 9 as applied to the side wall of a tire.

FIGS. 10 and 11 show protection device 7 in a preferred form of the invention as outlined in FIGS. 8 and 9, i.e., when attached to the side wall of a tire. As can be seen more clearly in FIG. 11, when protection device 7 is attached to the side wall of a tire 25, second elongate member 30C extends perpendicularly from the tire sidewall 25 to a greater extent than the front face 10 of the wheel rim or wheel trim. This ensures that when an impact is made against a curb or similar, protection device 7, and more particularly second elongate member 30C bears the initial impact, protecting the wheel from damage. Alignment tool 200, shown in FIG. 10, may be configured in a number of different ways so that it may aid in the alignment of wheel protection device 7, for example to a wheel rim.

The wheel protection device 7 of the present invention has a number of advantages. The protection device 7 has minimal parts and is therefore relatively inexpensive to manufacture. Customers will be provided with an affordable way to protect the wheel rims or wheel trims of their vehicles with a device that can be easily replaced when damaged by excessive kerb scraping.

Protection device 7 is simple to attach and may be retrofitted to existing unprotected wheel rims, or fitted at the point of manufacture. The protection device may also be attached to tyre faces, either at the point of manufacture, or retrofitted to existing tyres in any configuration required by the user. The kits containing the wheel protection device and instructions for use as discussed earlier will make retro-fitting the device to both wheels and tyres simple for all users.

Protection device 7, when fitted to either a wheel rim, wheel trim or tyre, does not interfere with changing either the tyre or replacing the wheel, and once fitted in position does not need to be removed for general wheel maintenance.

The preferred size and shape of protection device 7 is such that the device effectively protects a car wheel rim from scrapes caused by hitting a kerb with a vehicle wheel, but it is at the same time unobtrusive and does not interfere with the motion of the wheel in use or produce additional noise when driving. The preferred D-shape of the elongate member in particular makes the device easy to clean and unlikely to catch on passing objects.

The materials used to make protection device 7 are easily adapted to suit the different colour and design requirements of particular users, and the simplicity of the protection device makes it adaptable to suit a variety of users.

The wheel protection device can also be used to disguise existing damage to vehicle wheel rims or wheel trims, by attaching the device over the damage. This will be particularly beneficial by colour matching the wheel protection device to wheel colour.

Aspects of the present invention have been described by way of example only and it should be appreciated that modifications and additions may be made thereto without departing from the scope thereof as defined in the appended claims.

What we claim is:

1. A vehicle wheel protection device comprising:
   a first elongate member comprising:
      a first substantially planar surface for attachment to the side wall of a tire, front face of a wheel rim or wheel trim; and
      a second opposing outer surface shaped to fit at least a portion of a second elongate member; and
   a second elongate member, the second elongate member configured to be removably attached to said second opposing outer surface using an interference fit;
   wherein the second elongate member substantially corresponds to the circumference of the tire, wheel rim or wheel trim to which it is attached and no part of the first elongate member or second elongate member overlaps both the wheel rim and the tire, or wheel trim and tire when attached; and
   wherein, when attached to the first elongate member, the second elongate member extends perpendicularly from the tire side wall, front face of the wheel rim or wheel trim substantially further than the first elongate member; and
   wherein, if the vehicle wheel protection device is attached to the tire side wall, the second elongate member extends perpendicularly from the tire side wall to a greater extent than the front face of the wheel rim or wheel trim; and
   wherein the first elongate member is attached to the side wall of the tire, or front face of the wheel rim or wheel trim using an adhesive.

2. The vehicle wheel protection device of claim 1, wherein the second elongate member has a substantially D-shaped cross section.

3. The vehicle wheel attachment device of claim 1, wherein the adhesive is an adhesive tape.

4. The vehicle wheel protection device of claim 1, wherein the first and second elongate members are annular.

5. The vehicle wheel protection device of claim 4, wherein the outer diameter of the first annular elongate member is between 10 inches and 50 inches.

6. The vehicle wheel protection device of claim 1, wherein the first elongate member has a width of 4 mm-10 mm.

7. The vehicle wheel protection device of claim 1, wherein the first and second elongate members have a total height of 4 mm-10 mm when the second elongate member is attached to the first elongate member.

8. The vehicle wheel protection device of claim 7, wherein the elongate members have a height of 6 mm.

9. The vehicle wheel protection device of claim 1, wherein the elongate members are made from a substantially rigid plastic material.

10. The vehicle wheel protection device of claim 9 wherein the elongate members are made from nylon.

11. A method for protecting vehicle wheels from curb damage, the method comprising attaching the vehicle wheel protection device of claim 1 to the side wall of a tire or the front face of a wheel rim or wheel trim.

12. A kit for protecting vehicle wheels from damage, the kit comprising:
a first elongate member comprising:
a first substantially planar surface for attachment to the side wall of a tire, front face of a wheel rim or wheel trim; and
a second opposing outer surface shaped to fit at least a portion of a second elongate member; and
a second elongate member, the second elongate member configured to be removably attached to said second opposing outer surface using an interference fit; and
at least one adhesive adapted to attach the first surface of the first elongate member to a tire side wall, wheel rim or wheel trim, whereby no part of the first elongate member overlaps both the wheel rim and the tire or wheel trim and tire when attached and wherein the first elongate member contacts only the front face of the wheel rim or wheel trim or the side wall of the tire when attached using the adhesive; and
wherein the second elongate member substantially corresponds to the circumference of the tire, wheel rim or wheel trim; and
wherein when attached to the first elongate member, the second elongate member extends perpendicularly from the tire side wall, front face of the wheel rim or wheel trim substantially further than the first elongate member; and
wherein, if the vehicle wheel protection device is attached to the tire side wall, the second elongate member extends perpendicularly from the tire side wall to a greater extent than the front face of the wheel rim or wheel trim.

13. The kit of claim 12 wherein the elongate members are annular members.

14. The kit according to claim 12, wherein the kit includes between 2 and 8 elongate members.

15. The kit according to claim 14, wherein the kit includes 8 annular members.

16. The kit according to claim 12, wherein the adhesive means is an adhesive tape.

17. The kit according to claim 12, wherein the kit further includes an alignment tool.

* * * * *